T. B. TIEFENBACHER.
TIRE TREAD.
APPLICATION FILED MAR. 11, 1914.
1,128,387.
Patented Feb. 16, 1915.
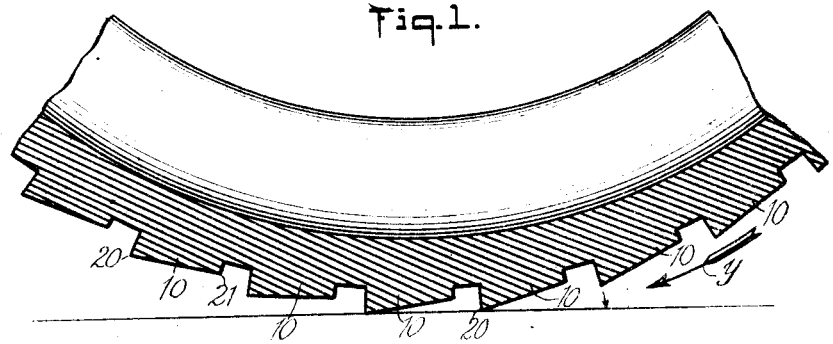
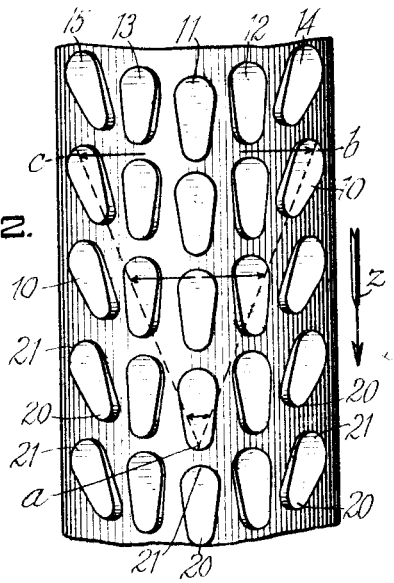
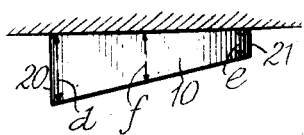
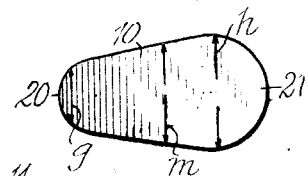
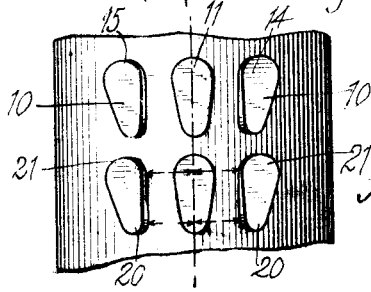
WITNESSES
F. Hogg
Jos. Bistano
INVENTOR
Thomas B. Tiefenbacher,
BY Carl P. Goepel
ATTORNEY

UNITED STATES PATENT OFFICE.

THOMAS B. TIEFENBACHER, OF NEW YORK, N. Y.

TIRE-TREAD.

1,128,387.  Specification of Letters Patent.  Patented Feb. 16, 1915.

Application filed March 11, 1914. Serial No. 823,928.

*To all whom it may concern:*

Be it known that I, THOMAS B. TIEFENBACHER, a citizen of the United States of America, and resident of the borough of Manhattan, in the city of New York, county and State of New York, have invented certain new and useful Improvements in Tire-Treads, of which the following is a specification.

This invention relates to tire-treads, and has for its object to provide an improved tread lug which will prevent skidding or slipping and provide a secure hold, so as to prevent the turning of the wheels, without useless effort.

For this purpose my invention consists of the improvements shown in the drawing hereto annexed, and which will be more fully described hereinafter and finally pointed out in the claims.

In the accompanying drawing, Figure 1 is a vertical section of a portion of a tire provided with my improved tread lugs, Fig. 2 is a plan view thereof. Fig. 3 is a side-view of one of the tread lugs showing the feature of my invention, which consists in having one portion thereof of greater height than the other. Fig. 4 shows a plan-view of a tread lug with another feature of my invention clearly shown thereby, which consists in having the width of the tread lug of increasing amount, and Fig. 5 shows a modified form of tire embodying the invention.

Similar reference characters indicate corresponding parts throughout the different figures of the drawing.

Referring to the drawing, and more particularly to Fig. 2, the tire is provided with a plurality of tread lugs 10, which have one series of tread lugs arranged along the middle portion of the tire and which form one line 11, and which may be bounded by other lines 12 and 13, one at either side of the central line 11. This central line 11 is bounded, as is seen, by lines 12 and 13, and by lines 14 and 15, which are arranged at an angle to the line 11. The five lines of tread lugs are clearly shown in Fig. 2, in which the tread lugs forming the line 14 and the tread lugs forming the line 15 are arranged at an angle to the tread lugs forming the central line 11, so as to have a wedge-shape formation, which is indicated in dotted lines, forming the wedge triangle $a$, $b$, $c$.

Each of the tread lugs, whether arranged in the parallel lines 11, 12 and 13, or in the lines 14 and 15 which have the tread lugs at an angle to the longitudinal line of the tire, has its forward-portion 20 at a greater height than its rearward-portion 21, so that the forward-portion 20 has a height $d$, whereas the rearward-portion 21 has a height $e$, and intermediate these two extreme positions an intermediate height $f$ is arranged. Each tread lug also has its forward-portion 20 of smallest width corresponding to the width $g$, and its rearward-portion 21 of largest width corresponding to that indicated by $h$, and its intermediate portion, between the forward and rearward portions, of an intermediate width corresponding to that indicated by $m$. It will thus be seen that the height of the tread lug varies from the greatest height at the forward-portion to the smallest height at its rearward-portion; whereas the width varies increasingly from the smallest width at the forward-portion to the greatest width at the rearward-portion.

The arrows $y$ and $z$ indicate the direction of movement of the tire so as to show which part of the tread lug enters the ground first, and from this it will be seen that the forward-portion 20, which has the greatest height and the smallest width, enters the ground first, and gradually the greater width enters the ground. The object and advantage of this arrangement are that as the tread lug enters the ground it secures a firm grip thereon, but by reason of the constantly increasing width of the tread lug a greater resistance is offered to the entry of the tread lug into the dirt or road, and hence skidding or slipping is effectually prevented. At the same time the angular positions of the outside tread lugs 14 and 15 act as a further wedge, in that they also prevent skidding or slipping, and thereby provide a very efficient tire.

The intermediate lines of tread lugs 12 and 13 are not necessary and may be omitted, as in Fig. 5, and then only the central line and exterior lines arranged at an angle to the central line remain. The outside tread lugs point inwardly. The inner edge of each outer tread lug is a straight line parallel to the longitudinal center line of the tire. The object of having these tread lugs directed inward is to avoid the crowding of the rubber from the center toward the outside of the tire, which is a common fault with many of the tires heretofore in use.

I have shown two embodiments of my invention, but changes may be made therein without departing from the same as defined in the appended claims, it being specially pointed out that the arrangement of the tread lugs on the tire itself may be varied in many different ways, and so the general configuration of the tread lugs may also be varied, without departing from the spirit of the invention, as defined by the appended claims.

I claim:

1. An improved tread lug for tires, having its rear-portion of smaller height than its forward entering portion and constantly increasing in width from its forward entering portion to its rear-portion.

2. An improved tread lug for tires, having a forward-portion of greater height than the rearward-portion and constantly decreasing in height from the forward-portion to the rearward-portion, and having its forward or entering portion of smallest width and having the width of the tread lug constantly increasing from the forward-portion to the rearward-portion.

3. An improved tire having a plurality of tread lugs thereon, each having the forward-portion of greater height than the rear-portion and its forward-portion of smaller width than its rearward-portion, and having one line of tread lugs arranged longitudinally on the tire in line with the longitudinal line of the tire, and having a row of tread lugs at either side thereof, each of said tread lugs being arranged at the same angle to the central row of tread lugs.

In testimony, that I claim the foregoing as my invention, I have signed my name in presence of two subscribing witnesses.

THOMAS B. TIEFENBACHER.

Witnesses:
F. Hogg,
Jos. Bisbano.